United States Patent
Grimard et al.

(10) Patent No.: US 6,591,662 B1
(45) Date of Patent: Jul. 15, 2003

(54) DEVICE FOR DETECTING TIGHTNESS OF THE LINK BETWEEN A SEALED ASSEMBLY OF TWO CHAMBERS INSULATED FROM OUTSIDE ENVIRONMENT

(75) Inventors: Jean-Pierre Grimard, Vif (FR); Jean-Yves Porret, Gieres (FR)

(73) Assignee: Becton Dickinson France S.A., Le Pont de Claix (FR)

( * ) Notice: Subject to any disclaimer, the term of this patent is extended or adjusted under 35 U.S.C. 154(b) by 0 days.

(21) Appl. No.: 09/857,061

(22) PCT Filed: Dec. 9, 1999

(86) PCT No.: PCT/FR99/03079
§ 371 (c)(1),
(2), (4) Date: Aug. 2, 2001

(87) PCT Pub. No.: WO00/36388
PCT Pub. Date: Jun. 22, 2000

(30) Foreign Application Priority Data

Dec. 11, 1998 (FR) .............................. 98 15850

(51) Int. Cl.[7] ................................................ G07M 3/08
(52) U.S. Cl. .......................................... 73/46; 73/49.8
(58) Field of Search ................. 73/49.8, 46; 376/272

(56) References Cited

U.S. PATENT DOCUMENTS 3,974,937 A * 8/1976 Eaton ........................ 220/239
4,274,007 A * 6/1981 Baatz et al. ................. 376/272
4,883,637 A * 11/1989 McDaniels, Jr. ............. 376/272
5,853,207 A * 12/1998 Saint Martin et al. ... 292/256.6

FOREIGN PATENT DOCUMENTS

GB        2177166 A    * 1/1987
WO        WO-99/05686  * 2/1999 .................... 73/46

* cited by examiner

*Primary Examiner*—Robert Raevis
*Assistant Examiner*—Michael Cygan
(74) *Attorney, Agent, or Firm*—David M. Fortunato

(57) ABSTRACT

A sealed connection device in which, two chambers ("A" and "B"), each has an access opening equipped with a door (2, 3) cooperating with a flange (4, 5) with the interposition of sealing means (12, 14), one (2) of the two doors being articulated with its flange (4). The detection device comprises two grooves (30, 35), formed in the external face of the flange (4) of chamber (A), a seal (36) placed in the groove (35), a network of ducts (31, 32, 33) formed in flange (4) and connecting the inner groove (30) to a coupling (34), a vacuum pump (38) the intake (37) of which is connected to the said coupling, and a sensor (44) measuring the strength of the partial vacuum in the pneumatic circuit leading to the groove (30) and reacting on alarm means (47, 48) if ever the partial vacuum does not reach an appropriate value.

2 Claims, 5 Drawing Sheets

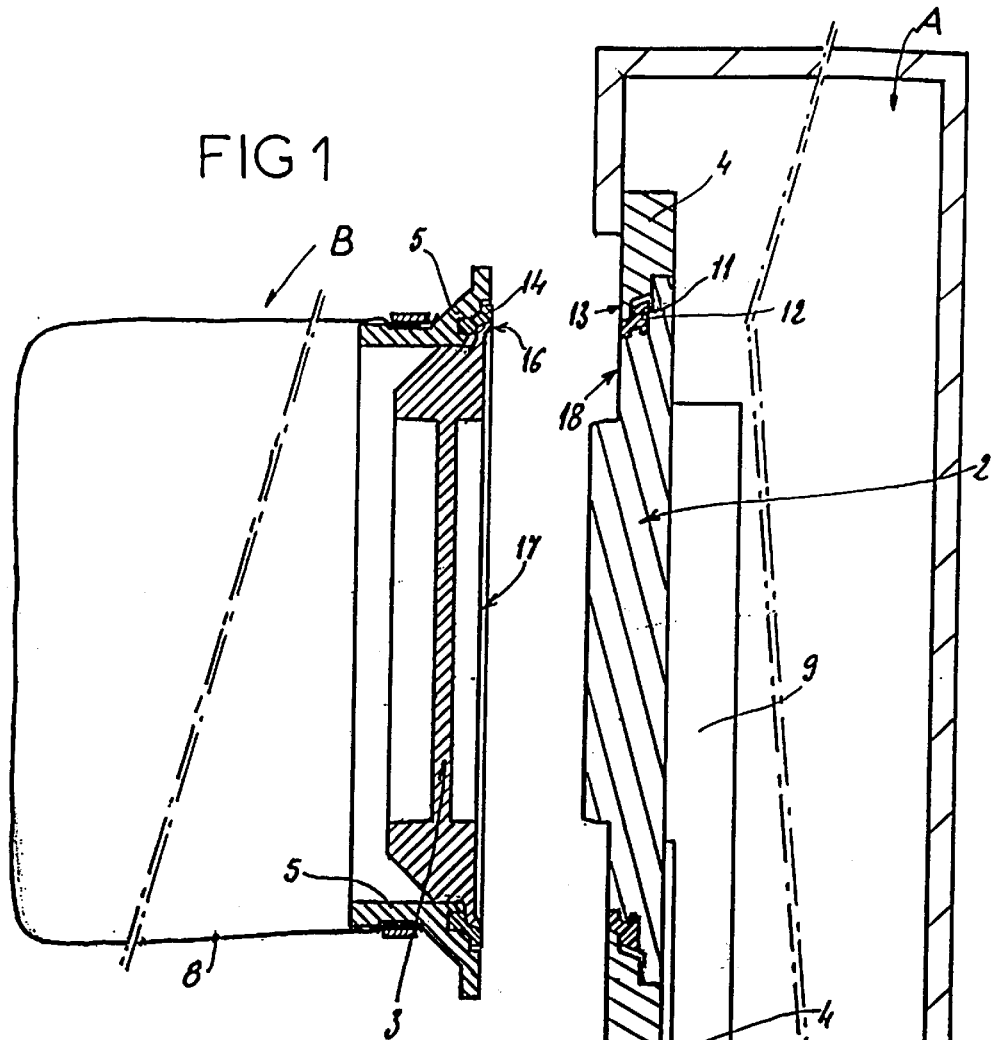
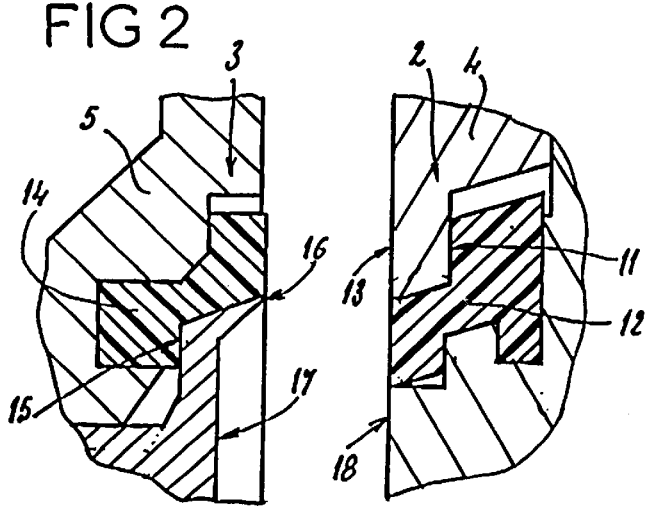

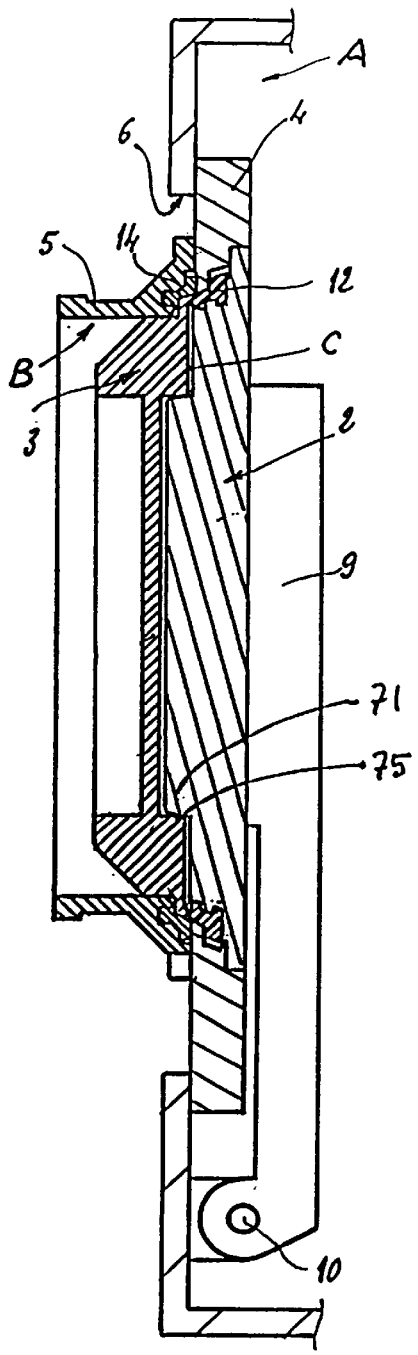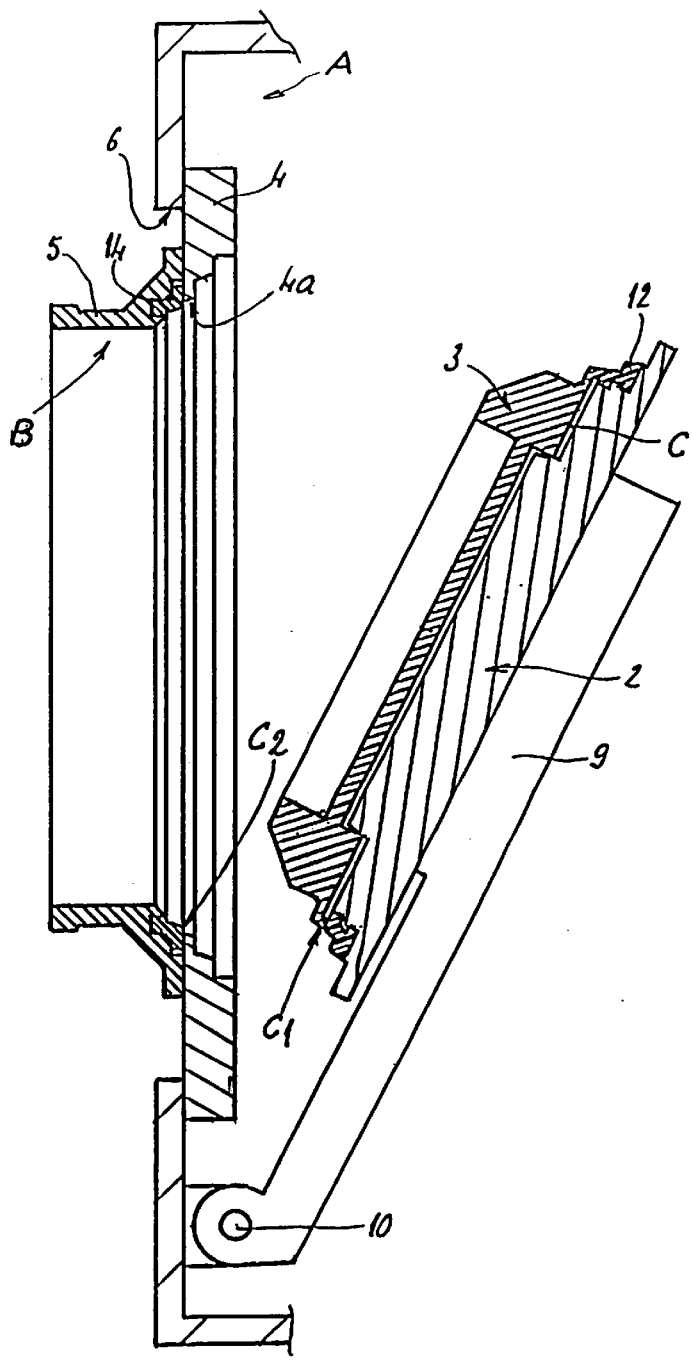

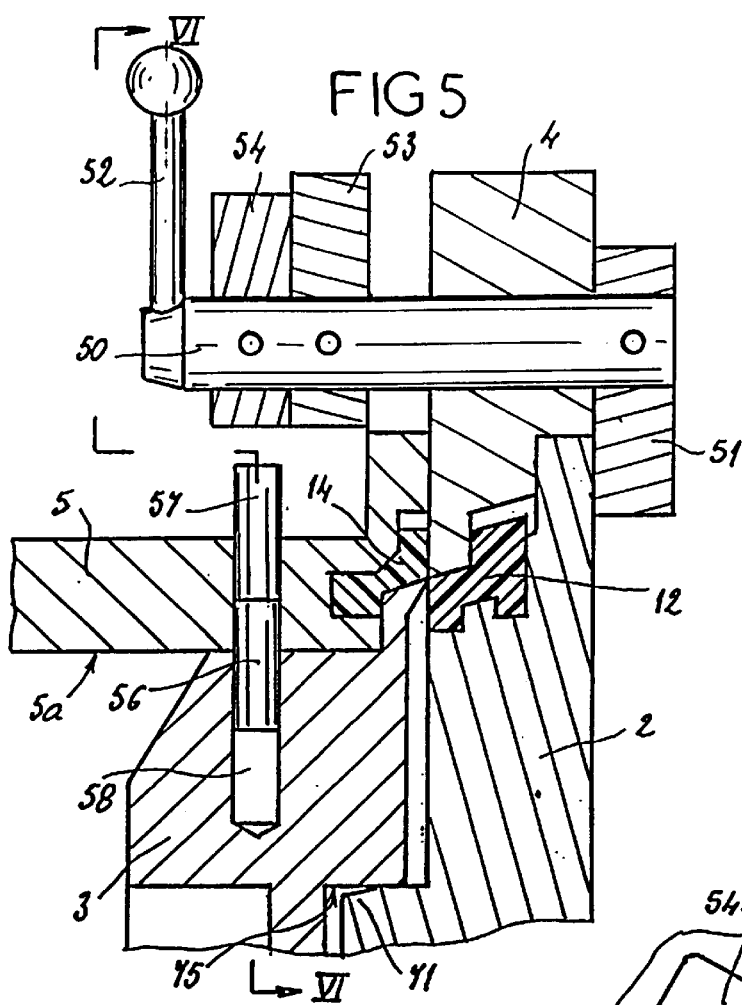
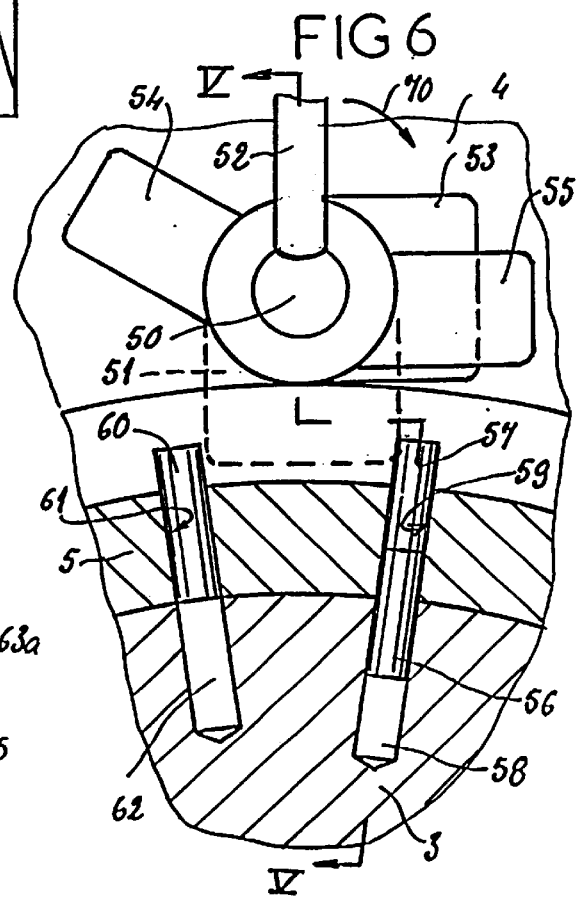
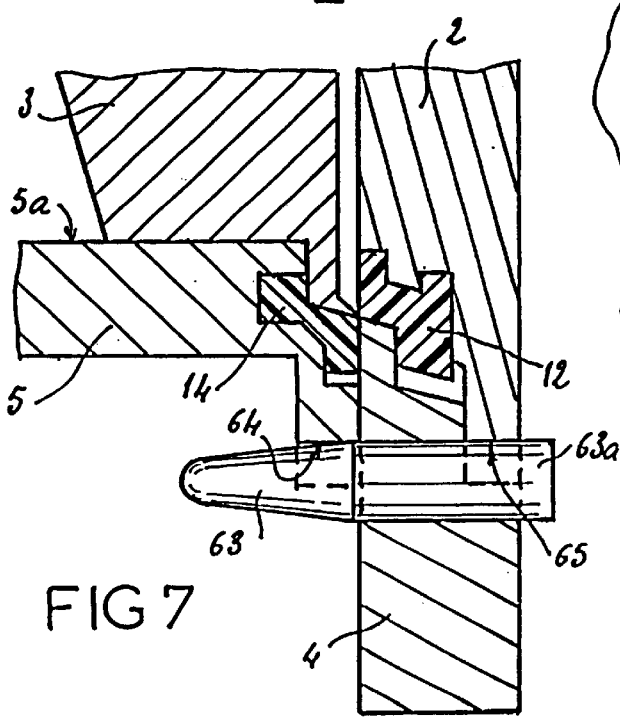

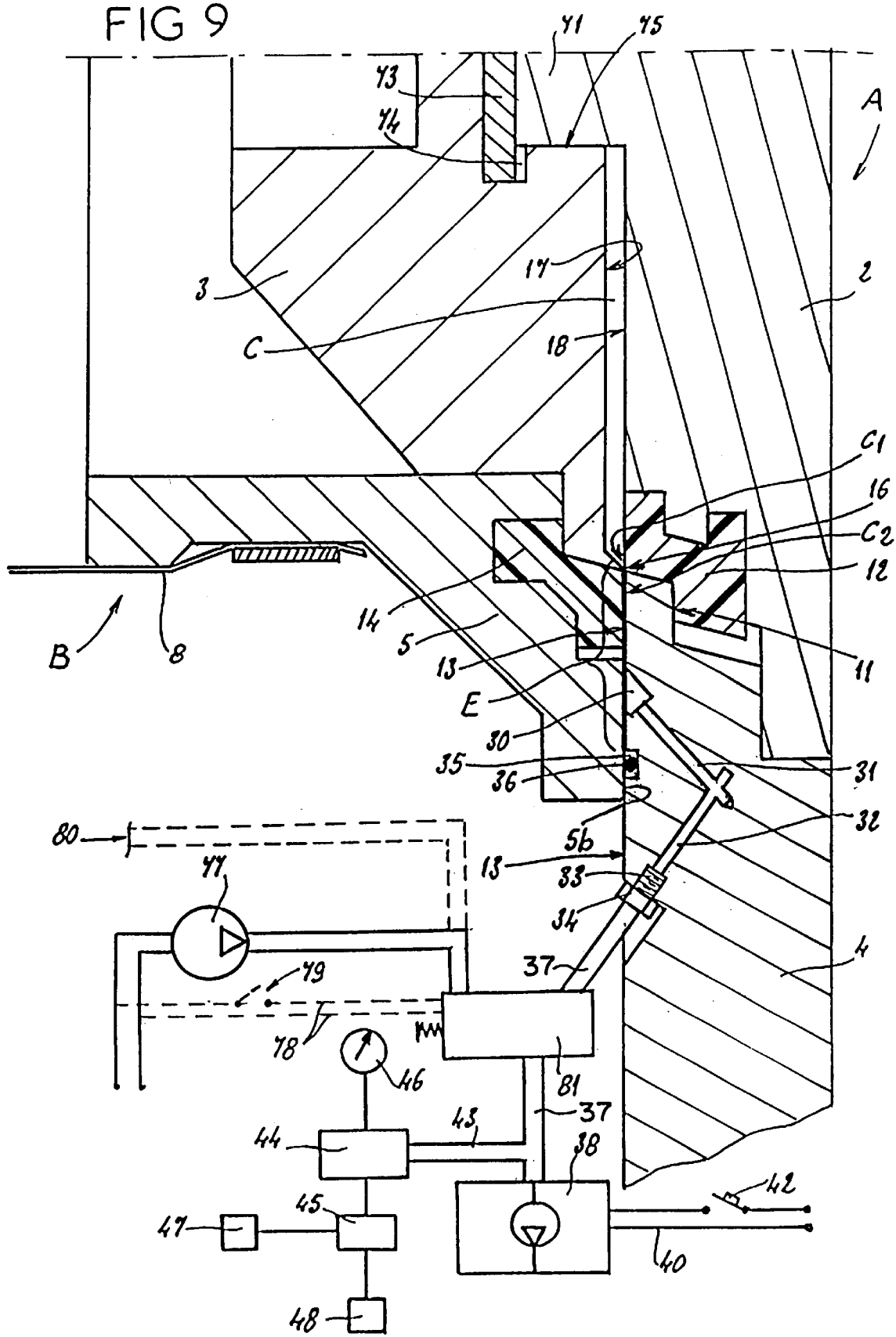

DEVICE FOR DETECTING TIGHTNESS OF THE LINK BETWEEN A SEALED ASSEMBLY OF TWO CHAMBERS INSULATED FROM OUTSIDE ENVIRONMENT

BACKGROUND OF THE INVENTION

Device for detecting whether the connection between the elements of a device for the sealed connection of two chambers isolated from the external medium, for example with a view to transferring the contents of one of the chambers to the other chamber, is sealed.

BRIEF SUMMARY OF THE INVENTION

For the purposes of this description, and of the interpretation of the appended claims, the terms "sealing" or "sealed" mean the characteristic whereby any wall separating two types of medium prevents or limits any transfer of one or more reference substances, for example so-called contaminating substances, through the said wall.

The terms "contaminating" or "contamination" mean the characteristic whereby a substance must remain excluded, or in a limited quantity or concentration, in a given medium. This may, for example, be a pathogen or polluting agent of biological or some other nature, but may also be simple solid, liquid or gaseous particles that can be placed in suspension in any fluid medium.

More specifically, although not exclusively, the present invention will be described hereafter with reference to an application of a medical or biological type, requiring any contamination, including by particles, from the external medium to be avoided or limited. By way of example, one of the chambers, hereafter called "A", consists of a clean room or sterile room, hence stationary, though it may also be a displaceable chamber, and the other chamber, hereafter called "B" is removable and transportable, for example a disposable chamber, and contains one or more objects, or a charge to be transferred, when the sealed connection device described hereafter is in the coupled position, through the passage thus formed between the two chambers, namely from the transportable chamber to the stationary chamber, for example to supply the latter with components or products required for the manufacture or production in progress within the clean room or, conversely, to discharge waste or products from the said room.

Such situations also arise in the nuclear, electronic, pharmaceutical and medical fields.

Before giving any explanation about the detection device of the present invention, it is necessary, with reference to the appended FIGS. 1 to 7, to describe a device for the sealed connection of two chambers, in accordance with the state of the art, and in which the temporary coupling of the doors 2 and 3 each borne by a stationary frame in the form of a flange 4 and 5 respectively, forms a chamber "C". One of these doors, namely the door 2, is arranged on the opening 6 of a stationary chamber "A" isolated form the external medium, while the other door, namely the door 3, is arranged in the opening of another chamber "B", also isolated from the external medium. The invention relates more specifically, although not exclusively, to the application of this device to the connecting-together of a sterile chamber "A" and a transportable or mobile chamber "B", for example consisting of a transportable container formed by a casing made of synthetic material 8 fixed to the flange 5 of the door 3.

With this sealed joining device, the stationary chamber "A" is closed by a door 2, generally circular, borne by an arm 9 articulated about an axle 10, for example vertical, with respect to the flange 4. This door has sealing means, such as a compressible annular seal 12 cooperating with a bearing surface 11 of the flange 4 or vice versa.

Likewise the transportable chamber "B" is closed by a door 3, generally circular but of smaller diametral size than the opening 4a formed in the flange 4 for the door 2 of the stationary chamber, so that it can fit through this opening. The door 3 has means of sealing with its flange 5, namely a compressible annular seal 14 borne by the flange cooperating with a bearing surface 15 of the door 3 (cf. FIG. 2), or vice versa.

Each of the doors 2 and 3 is also associated with means of locking it to its flange in the closed position. In the embodiment depicted in FIGS. 5 and 6, defined hereafter, these locking means comprise a shaft 50 mounted so that it can rotate freely in a bearing of the flange 4, a rotary latch 51 wedged onto that end of the shaft that is located in the chamber A, and a lever 52 wedged onto that end of the shaft 50 which extends outside the chamber A. The rotary latch 51 is in the form of a blade and can occupy either a position in which, as shown in FIGS. 5 and 6, it presses the door 2 into a recess in the flange 4, or a position in which it is radially outside this door, to allow this door to move.

The shaft 50 also bears, wedged on it and from the outside of the flange 4 toward the lever 52, on the one hand, another rotary latch 53 which can wedge the flange 5 against the flange 4 and, on the other hand, two radial fingers 54 and 55 capable of cooperating with the means of wedging the door 3 on its flange 5. FIG. 6 shows that these various elements 51, 53, 54 and 55 are angularly offset with respect to one another and with respect to the lever 52.

The means of locking the door 3 to its flange 5 comprise two cylindrical pins 56, 57 engaged, as a tight fit and one after the other, in, respectively, a blind bore 58 in the door 3, and a bore 59 coaxial with the first bore and formed radially in the flange 5. The pins are engaged only partially so that the pin 57 projects out from the flange 5 and so that the pin 56 cuts across the internal bore 5a of the flange 5 taking the door 3 so as to lock the door to its flange. If the container is a disposable container, then another pin 60, visible in FIG. 6, is arranged in a bore 61 of the flange, aligned with a blind bore 62 of the door 3. At the start, the pin 60 is in the position depicted in FIG. 6, that is to say extends radially from the flange 5 at one end, while its other end lies flush with the bore 5a without entering the blind bore 62. This pin 60 and the coaxial pins 56, 57 are angularly offset on each side of the diametral plane containing the axis of rotation of the shaft 50 and are arranged in the circular paths of the fingers 54, 55 borne by this shaft.

Such a device is generally associated with other similar devices angularly spaced around the periphery of the flange 4.

Finally, to make the flange 5 of the removable chamber or container B easier to position with respect to the flange 4 of the stationary chamber A, and as shown in FIG. 7, the flange 4 is secured to several longitudinal fingers 63 projecting outwards and capable of cooperating with circular cutouts 64 made in the periphery of the flange 5. However, definitive positioning is ensured by engagement of a central boss 71 of the door 2 in a recess 75 of the door 3. Each finger may also be extended at 63a inside the stationary chamber to cooperate with cutouts 65 formed at the periphery of the door 2 to make the radial positioning of the latter with respect to the opening of the flange 4 easier at the end of the movement for closing it.

When no transfer is taking place, each of the doors 2 and 3 is locked, to its respective flange 4 and 5, by the latches 51 and the pins 56. When the contents of one chamber need to be transferred into the other chamber, for example when the contents of the transportable chamber "B" have to be transferred into the stationary chamber "A", the flange 5 of the door 3 of the transportable chamber "B" is brought, as shown in FIG. 1, against the flange 4 of the door 2 of the stationary chamber "A", where it is pre-positioned by the fingers 63, then definitively by the boss 72-recess 75 cooperation.

Turning the levers 52 in the direction of the arrow 70 of FIG. 6 simultaneously locks the flange 5 onto the flange 4, unlocks the door 2 from its flange 4 and unlocks the door 3 from its flange 5 through the fingers 55 driving in the pins 56, 57: this driving-in action brings the zone of contact between the pins 56, 57 even with the bore 5a of the flange, and thus releases the door 3.

In this position, depicted in FIG. 3, the annular seal 14 borne by the flange 5 is in sealed contact against a circular bearing surface 13 of the flange 4 (FIG. 2), thus isolating from the external medium the inside of the zone of connection between the two chambers "A" and "B". Likewise, the other annular seal 12 is in sealed contact with the door 3, and more specifically with a circular zone 16 thereof, thus isolating the gap between the two doors 2 and 3, that is to say the space "C". By virtue of this, the faces 17 and 18 of the doors, which hitherto were in contact with the external medium, are now confined within this space C. thus preventing the possibility of these faces subsequently contaminating the internal volume formed by the sealed union of the two chambers "A" and "B". In the case of the transfer of contaminating products, this space also prevents the possibility of the two faces 7 and 18, which, after transfer, will one against be in contact with the outside, contaminating the external medium.

It is clear from the foregoing that the means of sealing between, respectively, the two flanges 4 and 5 and the two doors 2 and 3, define two circular and continuous so-called critical lines of sealing, the integrity of which lines absolutely must be maintained in order to prevent any contamination by or of the external medium, and similarly by or of the space "C". In practice, these lines, respectively internal C1 and external C2, are virtually coincident.

The term "critical line" means, as is well known to those skilled in the art, a line with residual contamination by the medium external to the two chambers that have been brought into communication. After the two chambers have been coupled and brought into communication, this line is liable to come into contact with the atmosphere or fluid present in the passage formed between the two chambers, or into contact with the product or products passing through the said passage, and to contaminate them.

During these maneuvers, complementary connecting means described later and with which the exterior faces of the two doors 2 and 3 are equipped couple together and secure these doors together such that the movements of opening and closing the door 2 of the stationary chamber "A" are transmitted to the door 3 of the transportable chamber "B".

After the two doors 2 and 3 have been unlocked from their respective flanges 4, 5, the two chambers "A" and "B" can be brought into communication by pivoting the door 2° towards the inside of the stationary chamber "A", as shown in FIG. 4. This movement uncovers the opening 4a of the flange 4 and, because of the connection between the two doors 2 and 3, moves the door 3, which passes through this opening 4a and enters the stationary chamber "A".

After the contents of the transportable chamber "B" have been transferred into the stationary chamber "A", the doors are returned to the shut position.

Locking of the closure is then performed by turning the levers 52 in the opposite direction to the arrow 70 until the pins 60 are driven in by the fingers 54, if this chamber B is a disposable chamber, then by returning the levers to their central position depicted in FIG. 6, to allow the door 2 to be locked to its flange 4 by the rotary latches 51.

At this stage, both chambers A and B are once more hermetically closed and the chamber B can be removed by causing the critical lines to be broken and brining into contact with the outside the faces which hitherto had been isolated therefrom.

For a more complete description of the sealed joining device, reference can be made, for example, to French Patent FR-A-2,721,289 in the name of the IDC ISOLATEUR DENOMINATEUR COMMUN.

This method of sealed connection of two chambers isolated from the external medium is entirely satisfactory but can be improved upon as far as the guarantee of the integrity of the critical lines and therefore the absence of contamination of the stationary chamber A at the time of transfer maneuvers is concerned.

In effect, whether the critical line involved be the internal line C1, FIG. 4, between the two doors 2 and 3, or the external critical line C2, FIG. 4, between the two flanges 4 and 5, it may be that this becomes broken, for example by external particles or particles originating from wear of the seals, by inadequate compression of the seals or by incorrect operation of the means that provide the locked connection between the flanges or the means which provide the connection between the two doors.

This breakage is all the more serious if there is nothing to indicate that it has occurred and if one single transfer operation can contaminate either both chambers, and especially the stationary chamber A, or the external medium.

Devices for detecting leaks from sealing means are known. Thus, document GB-A-2,177,166 employs two pneumatic networks, one of which opens between two opposed seals and the other of which opens into the gap between two juxtaposed seals. Detection is achieved by injecting an air pressure into the network, halting injection and measuring the residual pressure after a determined length of time. Such a device is not applicable to a sterile environment because the flow of air may drive non-sterile particles from a non-sterile zone into a sterile zone, contributing to the contamination thereof.

The object of the present invention is to overcome these drawbacks and risks by providing a device for detecting whether the connection between the flanges of a device for sealed connection between two chambers isolated from the external medium is sealed causing no contamination of the critical zone.

The detection device according to the invention comprises:

two grooves in a ring, respectively an inner groove and an outer groove, formed in the external face of the flange of the stationary chamber A and emerging in the bearing zone of the end face of the flange of the transportable chamber B;

a network of ducts formed in the flange of the stationary chamber and connecting the above-mentioned inner groove to a coupling;

a vacuum pump, preferably outside the chambers and the intake of which is connected to the said coupling, while its electric power supply circuit comprises a member for closing this circuit;

a sensor measuring the strength of the partial vacuum in the pneumatic circuit leading to the groove and reacting on alarm means if ever the partial vacuum does not reach an appropriate value;

and a seal placed in the outer groove.

As soon as the flange 5 of the transportable chamber B has been positioned and pressed against flange 4 of the stationary chamber A, switching on the vacuum pump very soon generates in the groove of the flange a partial vacuum which extends between the two flanges and between the external critical line and the bearing zone of the seal of the outer groove. This partial vacuum tends to act even more firmly on the flange opposite and ensure that this flange is held, at least during the maneuvers in preparation for the transfer between the two chambers, namely locking the two flanges together, connecting the doors together, unlocking each of the doors opposite each other from its flange and placing the two chambers in communication.

If, for any one of the reasons explained earlier, the sealing of the region subject to partial vacuum between the two flanges is unsatisfactory, the sensor detects the deficiency and reacts on the alarm means which, either inform the operator that he needs to break off the maneuver before opening the doors, or themselves break off this maneuver.

Thus, each time there is a coupling maneuver, the integrity of the external critical line is checked, and the sealing of the protective zone preceding its between the two flanges is checked, thus avoiding any risk of the external medium contaminating the chambers A and B.

In the one embodiment of the invention, the pipe conveying the partial vacuum to the network of ducts formed in the flange of the stationary chamber is also connected to a source of compressed air with the interposition of a multiway electrically-operated valve capable, simultaneously, of isolating the pipe from the source of partial vacuum and from the branch with the sensor and of placing this pipe in communication with the source of compressed air so as to send into the internal groove a flow of pressurized air to encourage the flanges to part.

This simple and inexpensive arrangement simplifies the maneuver of separating the doors of the two chambers and makes it possible, in the vent of a wrong maneuver, to avoid any damage to the seals by tools used as levers to part the flanges of the chambers.

BRIEF DESCRIPTION OF THE SEVERAL VIEWS OF THE DRAWINGS

The invention will be better understood with the aid of the description which follows with reference to the appended diagrammatic drawing, depicting, in FIGS. 1 to 7, a joining device according to the state of the art and, in FIGS. 8 to 11, one embodiment of the device according to the invention.

FIGS. 1, 3 and 4 are views in diametral section of a device for sealed connection between two chambers isolated from the external medium, respectively when the doors of the two chambers are positioned facing each other, after these doors have been locked together, and after these two doors have been opened.

FIG. 2 is a part view in section showing, on an enlarged scale, one embodiment of the means of sealing between the two doors.

FIG. 5 is a part view in section on V—V of FIG. 6 showing, on an enlarged scale, one embodiment of the means of locking the flanges together and of the means of locking each door to its flange.

FIG. 6 is a view in part section of VI—VI of FIG. 5.

FIG. 7 is a part view in section showing, on an enlarged scale, one embodiment of the means of positioning the removable chamber on the stationary chamber.

FIG. 9 is a sectioned view similar to FIG. 8 but on a larger scale, showing the elements of the sealing detection device.

DETAILED DESCRIPTION OF THE INVENTION

Figure 8:
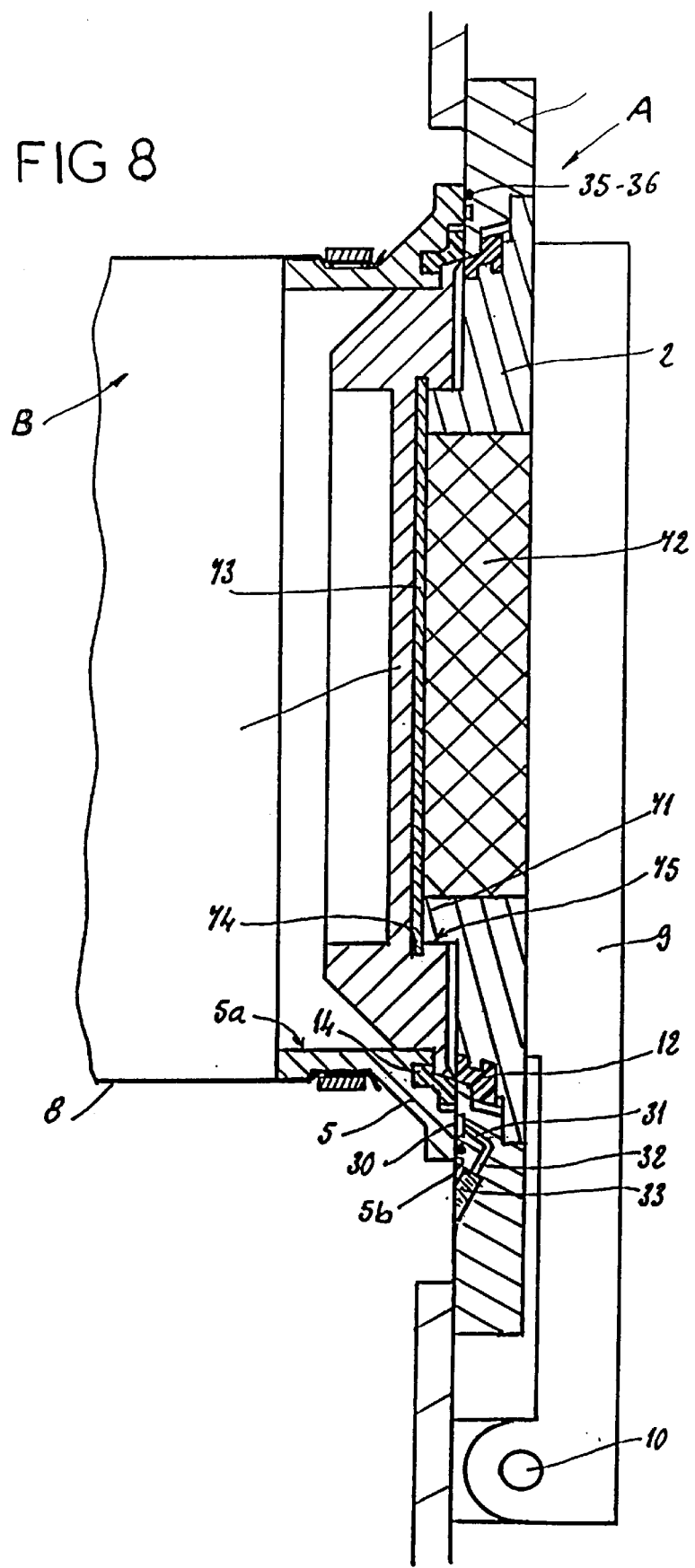
FIG. 8 is a view in diametral section of a sealed connection device equipped with one embodiment of the detection device according to the invention when the two doors are at the end of the positioning phase.

In the description which follows, elements which are common to the invention and to the state of the art explained earlier will bear the same reference numerals new elements being referenced between 30 and 49 and beyond 70.

As shown in FIGS. 8 and 9, the flange 4 of the stationary chamber A has an internal groove 30 which, in the form of a ring and, for example, circular, emerges from its face 13 against which the end face 5b of the flange 5 of the transportable chamber B bears. This groove 30 communicates with a duct 31 made in the flange 4 and into which another duct 32 extending a threaded bore 33 for a coupling 34 emerges.

An external groove 35 made in the flange 4 and around the groove 30 acts as a housing for a seal 36, for example an O-ring, capable of coming into contact with the flange 5 to limit air leaks. The fact that this seal 36 bears against the end face 5b of the flange 5 defines the exterior limit of the zone E between the two flanges 4 and 5, the sealing of which zone is checked and the interior bounds of which are delimited by the external critical line C2.

FIG. 9 shows that the coupling 34 is connected by a pipe 37 to a vacuum pump 38, for example an electric vacuum pump, preferably arranged outside the two chambers A and B.

The electric power supply circuit 40 for this pump comprises a closure member, such as a switch or circuit breaker 42, actuated manually or automatically. This switch is preferably arranged outside the two chambers "A" and "B", and, for example, is arranged on the external face of the stationary chamber "A" close to the means of controlling the locking of the flanges.

The pipe 37 is also connected, via a branch 43, to a sensor 44 of the vacuum gauge or some other type, measuring the strength of the partial vacuum in the pneumatic circuit and reacting, via pneumatic or electrical means, on a control unit 45. The sensor 44 may also be connected to an apparatus 46 for measuring the partial vacuum, of mechanical or electrical type.

The control unit 45 is connected, by electric circuits, either to an alarm 47 or to a means 48, for example an electromechanical or electronic means, interrupting the maneuver of opening the chambers.

When the transportable chamber B is positioned against the flange 4 of the stationary chamber A, manual actuation of the switch 42, or automatic actuation, for example by turning one of the levers 52 that control the locking of the flanges and the unlocking of the doors, switches on the vacuum pump 38. The latter generates a partial vacuum which, via the groove 30, extends into the zone E and holds the flange 5 firmly against the flange 4 with a force that depends on the strength of the partial vacuum.

It should be emphasized that with a strong partial vacuum, the pneumatic holding may also lock the two flanges together, as a replacement for the rotary latches 53 visible in FIGS. 5 and 6.

If the strength of the partial vacuum measured by the sensor 44 in the pneumatic circuit leading from the pump 38 to the space E does not reach a reference value corresponding to the desired degree of sealing in this zone E protecting the external critical line C2, and also corresponding to sealing of this critical line C2, as the result either of incorrect positioning or of a leak owing to wear or an undesirable presence, the sensor 44 reacts on the unit 45 and sets off the alarm 47 to inform the operator that he must not continue his maneuver of bringing the two chambers "A" and "B" into communication.

The sensor 44 can also react on electric, electronic or electromechanical means preventing this bringing into communication, for example by locking the door 2 of the stationary chamber A.

This sensor 44 therefore guarantees that these chambers or the external medium, if it is these chambers which are contaminating, is or are kept in the initial state. This check on the integrity of the critical line C2 and on the sealing of its protective zone E is particularly advantageous because it considerably improves the safety of the maneuver for the sealed connection of the chambers "A" and "B".

Another advantage of the use of a vacuum in the internal space "C" is that it reduces the risks of contamination of the sterile zone in the event of accidental breakage of the seal in this space "E" through the fact that the contaminated surfaces, namely the external faces are at a partial vacuum compared with the sterile zone and that, this being the case, the contaminating elements are attracted by the flow of air not towards the sterile zone, but towards the vacuum pump and, from there, out of the said sterile zone, if need be through a filter or another decontamination member.

The sensor 44 may also be used when connecting two chambers A and B, particularly in the context of a self-test procedure consisting in creating a partial vacuum in the pneumatic circuit leading to the groove 30 in order to check either that this circuit is not blocked or that the said sensor is operating correctly.

In FIGS. 8 and 9, the connection between the two doors 2 and 3 is provided, for example, by magnetic means comprising a magnet 72 arranged inside a central boss 71 of the door 2 of the stationary chamber "A". This magnet is intended to cooperate with a small metallic plate made of a ferrous material 73 held in a groove 74 of a recess 75 made in the door 3 opposite the aforementioned central boss.

This connection can also be provided by pneumatic means similar to those described earlier but acting between the doors.

In the embodiment depicted in FIG. 9, the pipe 37 conveying the partial vacuum to the coupling 34 is also connected to a source 80 of pressurized air or to an air pump 77, with the interposition of a multi-way electrically-operated valve 81, the electric circuit 78 of which is equipped with a contact, switch or some other means 79 of temporary closure.

After the doors 2, 3 have been closed again, manual or automatic actuation of the contact 79 closes the electric power-supply circuit of the electrically-operated valve 81 which, simultaneously, isolates the circuit extending from the vacuum pump 38 and the branch 43 containing the sensor 44, and places the pipe 37 in communication with the source of pressurized air. This flow of pressurized air spreads into the zone E between the two flanges 4 and 5 and makes them easier to part.

This operation is particularly advantageous when the force of connection, magnetic or other, between the two doors 2 and 3, makes the transportable chamber B difficult to separate from the stationary chamber A, because it avoids the need for tools for performing this separation and the associated risk of damaging the seal 36 and even the seals 12 and 14.

What is claimed is:

1. Device for detecting whether the temporary connection between the elements of a device for the sealed connection of two chambers A and B isolated from the external medium is sealed, in which device;

firstly, each chamber, respectively A which is stationary or displaceable and B which is movable or transportable, has at least one access opening equipped with a door (2, 3) cooperating, with the interposition of sealing means (12, 14), with a flange (4, 5) forming a stationary frame, one of the two doors (2, 3) being articulated to its flange (4, 5);

secondly, the two doors (2, 3) have means of locking to their respective flanges (4, 5) and complementary connecting means which, before the contents of one chamber have been transferred into the other chamber, and while the flanges (4, 5) are locked together in a sealed manner, allow the two doors (2, 3) to be connected thereby forming, through contact of sealing means (12, 16 and 13, 14), an internal space "C" isolating their faces (17, 18), now in contact, from the external medium;

and thirdly, external means of controlling the locking-together of the flanges (4, 5) and external means of controlling the unlocking of the doors (2, 3) from their flange are provided;

characterized in that it comprises:

two grooves in a ring, respectively an inner groove (30) and an outer groove (35), formed in the external face of the flange (4) of the stationary chamber (A) and emerging in the bearing zone of the end face (5b) of the flange (5) of the transportable chamber (B);

a network of ducts (31, 32, 33) formed in the flange (4) of the stationary chamber (A) and connecting the inner groove (30) to a coupling, (34);

a vacuum pump (38) outside the chambers (A, B) and the intake (37) of which is connected to the said coupling, while its electric power supply (40) circuit comprises a member (42) for closing this circuit;

a sensor (44) measuring the strength of the partial vacuum in the pneumatic circuit leading to the groove (30) and reacting on alarm means (47, 48) if ever the partial vacuum does not reach an appropriate value;

and a seal (36) placed in the groove (35).

2. Detection device according to claim 1, characterized in that the pipe (37) conveying the partial vacuum to the network of ducts formed in the flange (4) of the stationary chamber (A) is also connected to a source of compressed air (80 or 77) with the interposition of a multi-way electrically-operated valve (81) capable, simultaneously, of isolating the pipe (37) from the source of partial vacuum (38) and from the branch (43) with the sensor (44) and of placing this pipe (37) in communication with the source of compressed air (80 or 77) so as to send into the internal groove (30) a flow of pressurized air to encourage the flanges (4 and 5) of the chambers A and B to part.

* * * * *